ус011713819B2

(12) United States Patent
Nakamura et al.

(10) Patent No.: US 11,713,819 B2
(45) Date of Patent: Aug. 1, 2023

(54) VALVE DEVICE

(71) Applicant: FUJIKIN INCORPORATED, Osaka (JP)

(72) Inventors: Nobuo Nakamura, Osaka (JP); Kenta Kondo, Osaka (JP); Tomohiro Nakata, Osaka (JP); Tsutomu Shinohara, Osaka (JP)

(73) Assignee: FUJIKIN INCORPORATED, Osaka (JP)

(*) Notice: Subject to any disclaimer, the term of this patent is extended or adjusted under 35 U.S.C. 154(b) by 0 days.

(21) Appl. No.: 17/704,564

(22) Filed: Mar. 25, 2022

(65) Prior Publication Data
US 2022/0213965 A1    Jul. 7, 2022

Related U.S. Application Data

(63) Continuation of application No. PCT/JP2020/033936, filed on Sep. 8, 2020.

(30) Foreign Application Priority Data

Sep. 27, 2019 (JP) ................................ 2019-177873

(51) Int. Cl.
  *F16K 7/17* (2006.01)
  *F16K 7/16* (2006.01)
  *F16K 27/02* (2006.01)

(52) U.S. Cl.
  CPC .................. *F16K 7/17* (2013.01); *F16K 7/16* (2013.01); *F16K 27/02* (2013.01)

(58) Field of Classification Search
  CPC ... F16K 7/17; F16K 7/16; F16K 27/02; F16K 27/0236
  See application file for complete search history.

(56) References Cited

U.S. PATENT DOCUMENTS

| 5,706,859 A | * | 1/1998 | Backlund ............. F16K 11/022 |
| | | | 137/885 |
| 6,102,640 A | * | 8/2000 | Yokoyama .......... F15B 13/0825 |
| | | | 411/360 |

(Continued)

FOREIGN PATENT DOCUMENTS

| JP | H08511853 A | 12/1996 |
| JP | 2003014155 A | 1/2003 |

(Continued)

OTHER PUBLICATIONS

JP2005291481A , Koike, Translation (Year: 2005).*
JP2021008829A, Kawauchi Translation (Year: 2021).*
JP2016223533A, Matsuda , Translation (Year: 2016).*

*Primary Examiner* — Daphne M Barry
(74) *Attorney, Agent, or Firm* — Cantor Colburn LLP

(57) ABSTRACT

A valve device includes: a body formed with a valve chamber, a first inflow passage, a second inflow passage, an outflow passage, and an annular groove and provided with a valve seat; and a diaphragm configured to communicate with and interrupt the second inflow passage and the outflow passage. An end portion of the second inflow passage is open to the valve chamber. The valve seat is provided on a peripheral edge of a location where the valve chamber and the second inflow passage communicate with each other. The annular groove is open to the valve chamber and is formed around the second inflow passage. An end portion of the outflow passage is open to the annular groove. The first inflow passage has a plurality of flow passages including an inflow port and a plurality of outflow ports, and each outflow port is open to the annular groove.

4 Claims, 2 Drawing Sheets

(56) References Cited

U.S. PATENT DOCUMENTS

| | | | | |
|---|---|---|---|---|
| 10,648,572 B2* | 5/2020 | Sawada | ............... | G05D 7/0635 |
| 11,306,830 B2* | 4/2022 | Kondo | ..................... | F16K 7/16 |
| 2021/0131583 A1* | 5/2021 | Matsuda | .............. | F16K 11/022 |

FOREIGN PATENT DOCUMENTS

| JP | 2005291481 A | * | 10/2005 |
|---|---|---|---|
| JP | 2016223533 A | * | 12/2016 |
| JP | 2021008829 A | * | 1/2021 |

* cited by examiner

// VALVE DEVICE

CROSS REFERENCE TO RELATED APPLICATION

This application is a continuation application under 35 U.S.C. § 120 of PCT/JP2020/033936, filed Sep. 8, 2020, which is incorporated herein by reference and which claimed priority to Japanese Application No. 2019-177873, filed Sep. 27, 2019. The present application likewise claims priority under 35 U.S.C. § 119 to Japanese Application No. 2019-177873, filed Sep. 27, 2019, the entire content of which is also incorporated herein by reference.

TECHNICAL FIELD

The present disclosure relates a valve device for use in a semiconductor manufacturing device etc.

BACKGROUND

Japanese Patent Application Publication No. H08-5115853 proposes a valve device that has a valve body formed with a first side groove as a gas inlet path and a second side groove as a gas outlet path. The first side groove is configured so that its diameter is enlarged near the valve chamber.

SUMMARY

In order to increase the gas flow path, the diameter of the first side groove may be enlarged near the valve chamber as in the valve device of Japanese Patent Application Publication No. 2003-014155, but the flow rate cannot be sufficiently increased only by this configuration.

Therefore, one of the objects of the present disclosure is to provide a valve device having a body that is capable of achieving a large flow rate.

A valve device according to one or more embodiments of the present disclosure includes: a body that is formed with a valve chamber, a first inflow passage, a second inflow passage, an outflow passage, and an annular groove and is provided with a valve seat; and a diaphragm that is configured to communicate with and interrupt the second inflow passage and the outflow passage by abutting the valve seat and separating from the valve seat. An end portion of the second inflow passage is open to the valve chamber. The valve seat is provided on a peripheral edge of a location where the valve chamber and the second inflow passage communicate with each other. The annular groove is open to the valve chamber and is formed around the second inflow passage. An end portion of the outflow passage is open to the annular groove. The first inflow passage has a plurality of flow passages including an inflow port and a plurality of outflow ports, and each outflow port is open to the annular groove.

DETAILED DESCRIPTION

A valve device according to an embodiment of the present disclosure will be described with reference to the drawings.

Figure 1:
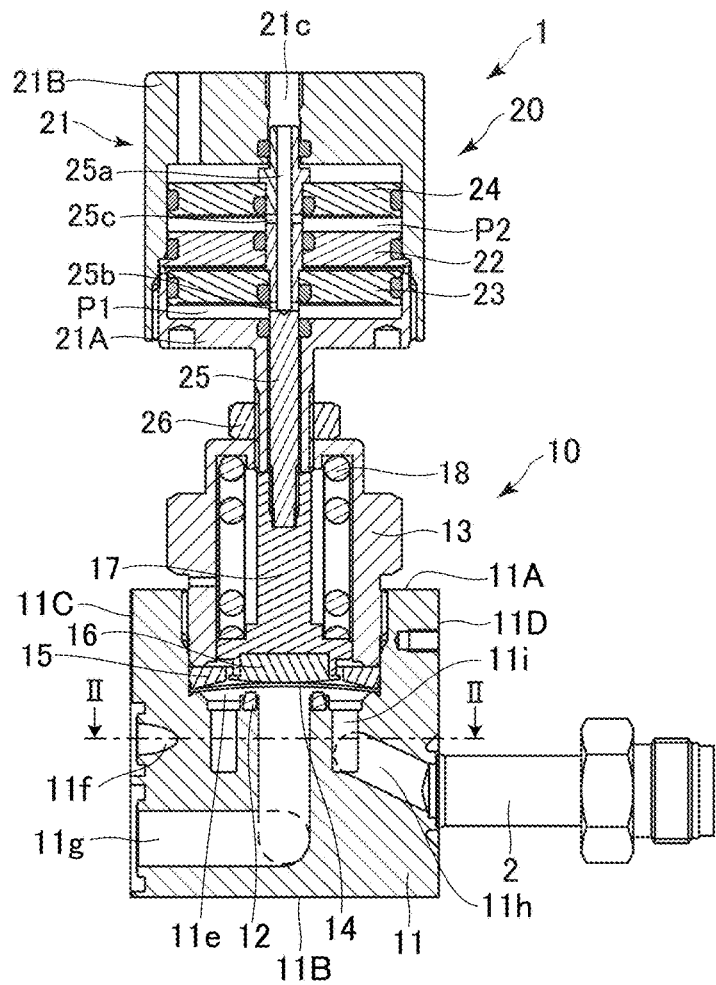
FIG. 1 is a cross-sectional view of a valve device in an open state according to an embodiment.
Figure 2:
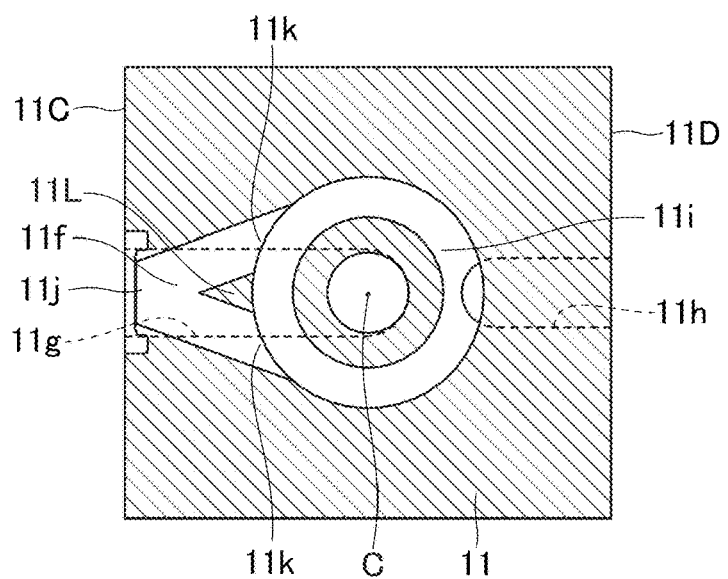
FIG. 2 is a cross-sectional view of a body taken along a line II-II of FIG. 1.

FIG. 1 is a cross-sectional view of a valve device 1 according to the present embodiment. FIG. 2 is a cross-sectional view of a body 11 taken along a line II-II of FIG. 1.

As illustrated in FIG. 1, the valve device 1 includes a body portion 10, an actuator 20. The valve device 1 according to the present embodiment is a so-called three-way valve device. In the following description, the side of the actuator 20 of the valve device 1 is defined as the upper side, and the side of the body portion 10 is defined as the lower side.

Body Portion 10

The body portion 10 includes the body 11, a seat 12 serving as a valve seat, a bonnet 13, a diaphragm 14, a retainer adapter 15, a diaphragm retainer 16, a holder 17, and a compression coil spring 18.

The body 11 is a substantially cube and has a first surface 11A which is an upper surface, a second surface 11B which is a lower surface, and a third surface 11C and a fourth surface 11D which are side surfaces and face each other. The body 11 is formed with a valve chamber 11e, a first inflow passage 11f, a second inflow passage 11g, an outflow passage 11h, and an annular groove 11i.

The valve chamber 11e is formed so as to open toward the first surface 11A. The second inflow passage 11g has a substantially inverted L shape in FIG. 1, one end thereof opens to the third surface 11C, and the other end opens to the valve chamber 11e. The resin seat 12 is formed in an annular shape, and is provided in the body 11 on the peripheral edge of a location where the valve chamber 11a and the second inflow passage 11g communicate with each other.

The annular groove 11i is open at the upper end to the valve chamber 11e and is formed around a portion of the second inflow passage 11g extending in the vertical direction. The outflow passage 11h is open at one end to the annular groove 11i and at the other end to the fourth surface 11D. The outflow passage 11h is located on the opposite side to the first inflow passage 11f so as to sandwich the portion of the second inflow passage 11g extending in the vertical direction. A pipe 2 is connected to a portion of the fourth surface 11D of the body 11 corresponding to the other end of the outflow passage 11h.

The first inflow passage 11f is located above the portion of the second inflow passage 11g extending in the horizontal direction (left-right direction in FIG. 1). As shown in FIG. 2, the first inflow passage 11f has a plurality of flow passages including one inflow port 11j and a plurality of outflow ports 11k, and each outflow port 11k opens to the annular groove 11i. In the present embodiment, the first inflow passage 11f is constituted by one inflow port 11j and two outflow ports 11k. That is, the first inflow passage 11f is branched into two flow passages. The body 11 has a branch portion 11L located between the inflow port 11j of the first inflow passage 11f and a central axis C of the annular groove 11i. The first inflow passage 11f is branched into two flow passages by the branch portion 11L. The branch portion 11L has a substantially isosceles triangle shape in a plan view.

The inflow port 11j of the first inflow passage 11f is open to the third surface 11C. Therefore, one end of the second inflow passage 11g and the inflow port 11j of the first inflow passage 11f are open to the same surface. The diameter (opening area) of the inflow port 11j of the first inflow passage 11f is smaller than the diameter (opening area) of one end (inflow port) of the second inflow passage 11g. That is, the diameter of the inflow port 11j of the first inflow passage 11f and the diameter of one end (inflow port) of the second inflow passage 11g are different from each other. The cross-sectional area of the first inflow passage 11f increases from the inflow port 11j toward the annular groove 11i.

As shown in FIG. 1, the bonnet 13 has a substantially cylindrical shape with a lid, and is fixed to the body 11 so as to cover the valve chamber 11e by screwing the lower end portion thereof into the body 11.

The diaphragm 14, which serves as a valve element, is held by pinching an outer peripheral edge portion thereof between the retainer adapter 15, which is disposed on a lower end of the bonnet 13, and a bottom surface forming the valve chamber 11e of the body 11. The fluid passage is opened and closed by causing the diaphragm 14 to separate from and abut (press against) the seat 12.

The diaphragm retainer 16 is provided on the upper side of the diaphragm 14, and configured to be capable of pressing the center portion of the diaphragm 14. The diaphragm retainer 16 is fitted to the holder 17.

The holder 17 has a substantially columnar shape, and is disposed in the bonnet 13 so as to be movable up and down. The stem 25, described later, is screwed to the upper portion of the holder 17.

The compression coil spring 18 is provided inside the bonnet 13 so as to bias the holder 17 downward at all times. Therefore, the valve device 1 is held in the closed state normally (when the actuator 20 is not driven) by the compression coil spring 18.

Actuator 20

The actuator 20 is an air-driven actuator and has a substantially columnar overall shape, and includes a casing 21, a partition disk 22, a first piston 23, a second piston 24, and a stem 25.

The casing 21 has a lower casing 21A and an upper casing 21B having a lower end portion of which is screwed to an upper end portion of the lower casing 21A. The lower casing 21A has a substantially stepped cylindrical shape. An outer periphery of a lower end portion of the lower casing 21A is screwed to the inner periphery of a through hole in the bonnet 13. The upper casing 21B has a substantially cylindrical shape with a lid. A fluid introduction passage 21c is formed in an upper end portion of the upper casing 21B.

A nut 26 is screwed to the outer periphery of the lower end portion of the lower casing 21A. The nut 26 abuts the bonnet 13 so as to suppress rotation of the lower casing 21A relative to the bonnet 13.

The partition disk 22 has a substantially disk-shape and is provided immovably inside the casing 21. The stem 25 penetrates a center portion of the partition disk 22.

The first piston 23 has a substantially disk-shape. The stem 25 penetrates a center portion of the first piston 23. A first pressure chamber P1 is formed by the lower casing 21A and the first piston 23.

The second piston 24 has a substantially disk-shape. The stem 25 penetrates a center portion of the second piston 24. A second pressure chamber P2 is formed by the second piston 24, the partition disk 22, and the upper casing 21B.

The stem 25 has a substantially columnar shape, and is provided so as to be movable in the up-down direction. A lower end portion of the stem 25 is screwed to the holder 17.

A fluid flow passage 25a that extends in the up-down direction is formed in an upper half of the stem 25. Further, first and second fluid outflow holes 25b and 25c that cross the fluid flow passage 25a are formed in the upper half of the stem 25. An upper end of the fluid flow passage 25a opens in an upper surface of the stem 25. The first fluid outflow hole 25b communicates with the first pressure chamber P1. The second fluid outflow hole 25c is positioned above the first fluid outflow hole 25b, and communicates with the second pressure chamber P2.

The stem 25 includes a plurality of stepped portions, and the stepped portions are in contact with an upper surface of the first piston 23 and an upper surface of the second piston 24. Consequently, the stem 25 and the holder 17 are moved upward when the first piston 23 and the second piston 24 are moved upward.

Opening/Closing Operation of Valve Device 1

Next, an opening/closing operation of the valve device 1 according to the present embodiment will be described.

In the valve device 1 according to the present embodiment, in a state where no drive fluid flows into the first and second pressure chambers P1 and P2, the holder 17 and the stem 25 are held at bottom dead center (close to the body 11) by the biasing force of the compression coil spring 18, the diaphragm 14 is retained by the diaphragm retainer 16, and the lower surface of the diaphragm 14 is pressed against the seat 12, whereby the valve device 1 is in a closed state. In other words, in a normal state (a state where no drive fluid is supplied), the valve device 1 is in a closed state.

A state in which drive fluid flows into the valve device 1 from a drive fluid supply source, is then established. As a result, the drive fluid is supplied to the valve device 1. The drive fluid passes through the fluid introduction passage 21c, the fluid flow passage 25a, and the first and second fluid outflow holes 25b and 25c by via an air tube and a pipe joint, not shown in the figures, then flows into the first and second pressure chambers P1 and P2. Thus, the first and second pistons 23 and 24 rise against the biasing force of the compression coil spring 18. Consequently, the holder 17 and the stem 25 move to top dead center, thereby separating from the body 11, and the diaphragm 14 is moved upward by elastic force thereof and the pressure of the fluid (gas), thereby communicating the second inflow passage 11g and the outflow passage 11h through the annular groove 11i. As a result, the valve device 1 enters an open state.

To bring the valve device 1 from the open state to the closed state, a three-way valve, not shown in the figures, is switched to a flow for discharging the drive fluid to the outside from the actuator 20 (first and second pressure chambers P1 and P2) of the valve device 1. Consequently, the drive fluid in the first and second pressure chambers P1 and P2 is discharged to the outside through the first and second fluid outflow holes 25b and 25c, the fluid flow passage 25a, and the fluid introduction passage 21c. Accordingly, the holder 17 and the stem 25 are moved to bottom dead center by the biasing force of the compression coil spring 18, and as a result, the valve device 1 enters the closed state.

The first inflow passage 11f is constantly communicates with the outflow passage 11h through the annular groove 11i. For example, the valve device 1 is closed to allow fluid (gas) to flow into the first inflow passage 11f from a fluid supply source not shown in the figure. As a result, the fluid (gas) is supplied to the valve device 1, and the fluid (gas) that flows into the inflow port 11j of the first inflow passage 11f branches at the branch portion 11L, flows to the annular groove 11i through the two outflow ports 11k, and flows out from the outflow passage 11h. The fluid (gas) supplied to the first inflow passage 11f may be different from or the same as the fluid (gas) supplied to the second inflow passage 11g.

According to the valve device 1 of the present embodiment described above, the first inflow passage 11f has the plurality of flow passages including one inflow port 11j and a plurality of outflow ports 11k, and each outflow port 11k opens to an annular groove 11i. With this configuration, the cross-sectional area of the flow passage on the primary side of the valve device 1 can be increased, so that the flow rate of the fluid (gas) flowing through the valve device 1 can be increased. Therefore, it is possible to provide the valve device 1 having the body 11 that is capable of achieving a large flow rate.

The body 11 has the branch portion 11L that is located between the inflow port 11j and the central axis C of the annular groove 11i and that branches the first inflow passage 11f into the plurality of flow passages. Therefore, the fluid flowing into the first inflow passage 11f flows into the annular groove 11i without any disturbance. Accordingly, the flow rate of the fluid (gas) flowing through the valve device 1 can be increased.

The inflow port 11j of the first inflow passage 11f and the inflow port of the second inflow passage 11g are open on the same surface (the third surface 11C) of the body 11, and the diameters of the inflow ports are different from each other. For example, even if the diameter of the inflow port 11j of the first inflow passage 11f is smaller than the diameter of the inflow port of the second inflow passage 11g, the first inflow passage 11f is configured as described above, so that the cross-sectional area of the flow passage on the primary side of the valve device 1 can be increased, and the flow rate of the fluid (gas) flowing through the valve device 1 can be increased.

Since the cross-sectional area of the first inflow passage 11f increases from the inflow port 11j toward the annular groove 11i, the cross-sectional area of the flow passage on the primary side of the valve device 1 can be increased, and the flow rate of the fluid (gas) through the valve device 1 can be increased.

The present disclosure is not limited to the embodiment discussed above. A person skilled in the art could make a variety of additions, modifications, etc., within the scope of the present disclosure.

Figure 3:
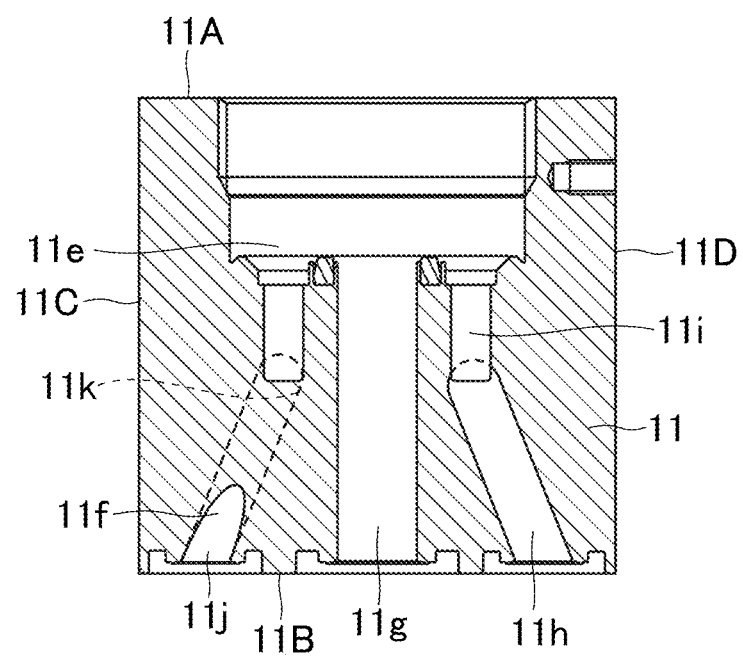
FIG. 3 is a cross-sectional view of the body according to the modification.

As shown in FIG. 3, the inflow port 11j of the first inflow passage 11f, one end of the second inflow passage 11g, and the other end of the outflow passage 11h may be configured to open to the second surface 11B. Then, as shown in FIG. 3, the first inflow passage 11f may be configured to be inclined with respect to the central axis of the annular groove 11i.

The first inflow passage 11f of the above embodiment is branched into two flow passages in a plan view as shown in FIG. 2, but may be branched into two flow passages in a side view. The first inflow passage 11f may be branched into a plurality of flow paths regardless of the plan view and the side view. The shape of the branch portion 11L is not limited to the shape of the above embodiment, and may be any shape as long as it does not disturb the fluid flow.

What is claimed is:

1. A valve device comprising:
    a body that is formed with a valve chamber, a first inflow passage, a second inflow passage, an outflow passage, and an annular groove and is provided with a valve seat; and
    a diaphragm that is configured to communicate with and interrupt the second inflow passage and the outflow passage by abutting the valve seat and separating from the valve seat,
    wherein an end portion of the second inflow passage is open to the valve chamber,
    the valve seat is provided on a peripheral edge of a location where the valve chamber and the second inflow passage communicate with each other,
    the annular groove is open to the valve chamber and is formed around the second inflow passage,
    an end portion of the outflow passage is open to the annular groove, and
    the first inflow passage has a plurality of flow passages including an inflow port and a plurality of outflow ports, and each outflow port is open to the annular groove.

2. The valve device according to claim 1, wherein the body has a branch portion that is located between the inflow port and a central axis of the annular groove and that branches the first inflow passage into the plurality of flow passages.

3. The valve device according to claim 1, wherein the inflow port of the first inflow passage and an inflow port of the second inflow passage are open on a same surface of the body, and diameters of the inflow ports are different from each other.

4. The valve device according to claim 1, wherein a cross-sectional area of the first inflow passage increases from the inflow port toward the annular groove.

\* \* \* \* \*